United States Patent [19]

Nomura et al.

[11] 4,394,559
[45] Jul. 19, 1983

[54] ARC WELDING METHOD

[75] Inventors: Hirokazu Nomura; Yuji Sugitani, both of Tsu; Yasuo Suzuki, Hisai, all of Japan

[73] Assignee: Nippon Kokan Kabushiki Kaisha, Toyko, Japan

[21] Appl. No.: 333,403

[22] Filed: Dec. 22, 1981

[30] Foreign Application Priority Data

Dec. 27, 1980 [JP] Japan .............................. 55-188685

[51] Int. Cl.³ .............................................. B23K 9/12
[52] U.S. Cl. ........................... 219/125.12; 219/124.32; 219/137.71
[58] Field of Search ...................... 219/124.32, 125.12, 219/137.71, 124.34

[56] References Cited

U.S. PATENT DOCUMENTS 3,612,818 10/1971 Bechtle ........................... 219/137.71
3,855,446 12/1974 Kotova et al. .................. 219/124.34
3,924,094 12/1975 Hansen et al. .................. 219/124.34

FOREIGN PATENT DOCUMENTS 50-8703 4/1975 Japan .............................. 219/124.34

Primary Examiner—C. C. Shaw
Attorney, Agent, or Firm—Fleit, Jacobson & Cohn

[57] ABSTRACT

An arc welding method in which with a welding electrode being oscillated within the groove in the width direction thereof, the movement of the electrode in the upright or vertical direction is controlled to always maintain the arc length constant. The groove of a predetermined shape is subjected to arc welding with predetermined welding speed and wire feed speed so that when a half cycle of the electrode oscillation is completed, the height direction displacement of the electrode is integrated over the time to obtain a cross-sectional area $S_o$ described by the electrode and also an oscillation stroke $X_o$ made by the electrode is obtained, thus storing the cross-sectional area $S_o$ and the oscillation stroke $X_o$. When the next half cycle is completed, a cross-sectional area $S$ and an oscillation stroke $X$ are similarly obtained so that the welding speed or the wire feed speed is controlled to vary and thereby to vary the cross-sectional area of metal deposition by an amount $\Delta S$ which is determined by the following equation $$\Delta S = S - \frac{X}{X_o} S_o$$

The deposition rate is controlled in accordance with the actual cross-sectional area of the groove and thus a weld bead of a uniform height or level is produced.

5 Claims, 22 Drawing Figures

FIG. 8A
$V_f = C_1 \cdot S \cdot V$

FIG. 8B
$V_f = C_2 \cdot S \cdot V$

FIG. 8C
$V_f = C_3 \cdot S \cdot V$

ARC WELDING METHOD

BACKGROUND OF THE INVENTION

The present invention relates to automatic arc welding methods of the type employing a consumable or non-consumable electrode which is moved along the direction of the weld line of a welding joint, and more particularly the invention relates to an arc welding method so designed that under a unattended operating condition, a welding electrode is reciprocated or oscillated in the width direction within the groove and simultaneously the movement of the electrode in the vertical or upright direction is controlled so as to always maintain the arc length constant.

To realize an unattended automatic welding, it is necessary to use a torch sensor and a torch position adjusting mechanism for automatically sensing and controlling the torch position with respect to the two dimensional deviation of the groove line which varies from instant to instant during the welding operation.

In the past, various sensors of the above type have been used and they include the contact types, such as, the differential transformer, potentiometer and limit switch types and the non-contact types, such as, the electromagnetic and optical position detecting types. However, since the use of these sensors requires that a sensor or a specific device be positioned near the torch in any case, it is necessary to maintain a predetermined distance between the sensing position and the controlled system position due to the dimensional limitation and it has been possible to realize only such control systems which have a limited accuracy despite its complicated construction in which the torch position is controlled by providing the sensor output with a time differential corresponding to the dimension of the spacing.

Further, the automatic welding requires the automatic control of welding conditions in accordance with variations in conditions such as the shape of the groove and it has mostly been the practice to effect the desired adjustment, setting and control through manual operations. Same methods have been proposed in which the groove width in the front of the arc is detected by means of electromagnetic induction, the reflection of light or the like so as to feedback control the welding conditions, and the control by such method is also limited by the fact that the true groove cross-section is not evident, although it is possible to detect the width of the groove. Practically, there has been no groove cross-section detecting method which is suited for automation, and anyway the above-mentioned sensing means not only involve a deviation of the sensing position from the arc position but also require the use of separate sensors for the previously mentioned tracing purposes and the welding condition controlling purposes, thus making it extremely difficult to realize a system capable of accurate control.

SUMMARY OF THE INVENTION

With a view to overcoming the foregoing deficiencies in the prior art, it is the general object of the present invention to provide an improved arc welding method which utilizes the characteristics of a welding arc itself in such a manner that the tracing and the detection of the groove cross-sectional shape are effected without using any separate sensor and the automatic welding conditions are accurately controlled, thus always depositing a weld bead having a uniform height or level.

In accordance with the present invention there is thus provided an arc welding method of the type in which the welding is accomplished by oscillating a welding electrode in the width direction of the groove while controlling the vertical movement of the welding electrode so as to maintain the arc length constant. The method is so designed that one of the welding wire feed speed and the welding speed is maintained constant and the other is controlled to vary its speed, whereby simultaneously with the tracing control by the arc itself the cross-sectional area of the groove weld to be deposited is detected in accordance with the amount of vertical movement of the electrode for each half cycle of the oscillation so that the said variable speed control is effected accurately in accordance with variations in the cross-sectional area of the groove and also the welding current is controlled in accordance with the result of the variable speed control, thus a stable welding with a constant-level weld bead is always effected automatically in accordance with variations in the shape of the groove or variations in the underlaying bead.

In accordance with the arc welding method of this invention, a DC constant current source or constant voltage source is used as a welding current source and the distance between the lower end face of an electrode and the surface of a base metal is varied by a welding electrode driving mechanism so as to always maintain a predetermined arc voltage or arc current, whereby the control operation for always maintaining the arc length constant is combined with the electrode driving operation which while moving the electrode at a controlled speed in the direction of welding (hereinafter referred to as a welding speed), oscillates the electrode in the width direction of the welding direction at a predetermined speed (hereinafter referred to as a transverse speed). The turning point of the oscillation is set to a point where the said distance attains a predetermined value so that the arc always oscillates along the slopes of the groove face within the width of the groove thus effecting the tracing operation and also the arc welding is effected in such a manner that the distance from the base metal surface to the terminal end of the oscillation is always held constant. The change of the distance for each half cycle of the oscillation is also integrated over the time to produce a signal corresponding to the cross-sectional area of metal deposition and the signal is used to control the welding conditions for each half cycle, thereby accomplishing the arc welding so as to maintain uniform the level of the weld metal within the groove.

DESCRIPTION OF THE PREFERRED EMBODIMENTS

Figure 1:
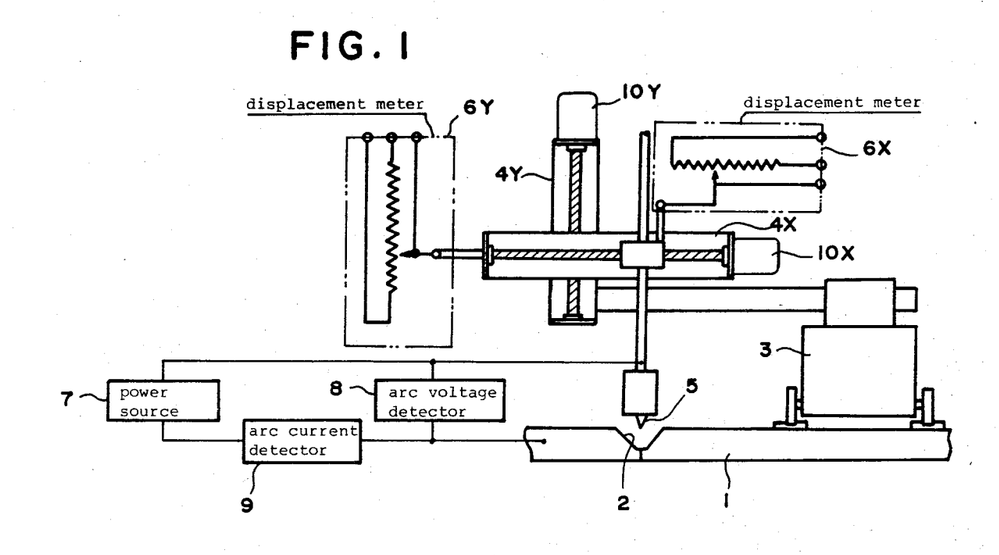
FIG. 1 is a schematic diagram showing an exemplary construction of a welding apparatus for performing a method according to the present invention.

FIG. 1 is a schematic diagram showing by way of example the principal construction of a welding apparatus for performing a method according to the invention. A welding traveller 3 is movable along a groove 2 of a base metal 1 to be welded together, and a welding electrode 5 is supported on the welding traveller 3 by means of vertical-direction (Y-axis) and groove width-direction (X-axis) driving mechanisms 4Y and 4X so that the welding electrode 5 is moved in the groove lengthwise direction while oscillating it in the width direction within the groove and simultaneously a displacement meter 6Y comprising a potentiometer or the like detects the displacement in the Y-axis direction of the electrode 5 which is controlled to maintain the arc length constant. Also, a displacement meter 6X comprising a potentiometer or the like detects the X-axis direction displacement of the electrode 5 in its oscillation in the groove width direction. The welding electrode 5 may be either a consumable electrode or non-consumable electrode and in FIG. 1 the electrode 5 comprises a non-consumable electrode. A welding power source 7 is connected between the electrode 5 and the base metal 1 and the power source 7 comprises a constant current source or a constant voltage source depending on the welding application. An arc voltage detector 8 and an arc current detector 9 will be provided only when they are necessary from the control point of view. The basis of the control system according to the invention resides in a constant arc length controlling oscillation welding which is effected by oscillating the electrode 5 in the width direction (X axis) within the groove 2 and simultaneously moving the electrode 5 in the vertical direction (Y axis) so as to always maintain the arc length constant. The electrode 5 is oscillated in the X-axis direction by the driving mechanism 4X which in turn is driven by an X-axis motor 10X and the movement of the electrode 5 in the Y-axis direction is controlled by a Y-axis motor 10Y. While, in the illustrated embodiment, the driving mechanism 4X supporting the electrode 5 to be movable in the X-axis direction is supported on the driving mechanism 4Y so as to be movable in the Y-axis direction and the driving mechanism 4Y is supported on the traveller 3, the invention is not intended to be limited to the described supporting relation.

Figure 2:
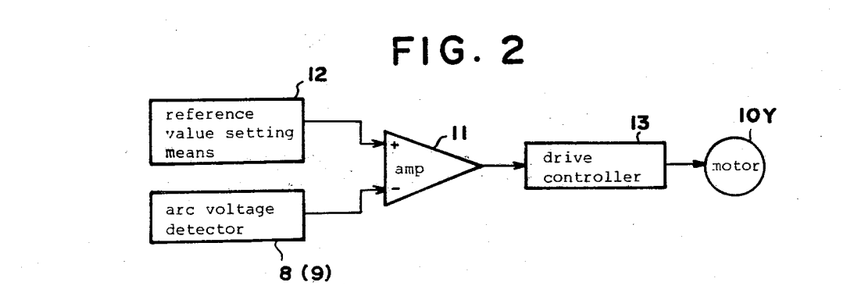
FIG. 2 is a block diagram showing a Y-axis direction constant arc length control circuit.

FIG. 2 is a block diagram showing a basic circuit for the constant arc length control by the Y-axis motor 10Y. Where the power source 7 is a constant current source, a differential amplifier 11 is supplied with the arc voltage from the arc voltage detector 8, and the differential amplifier 11 receives the arc current from the arc current detector 9 if the power source 7 is a constant voltage source. Thus, the differential amplifier 11 generates the difference between the input and the reference value preset into setting means 12, and there is provided a drive controller 13 which operates the Y-axis motor 10Y at a speed corresponding to the difference output. This circuit maintains the arc voltage (or the arc current) constant so that the arc length is maintained constant, and the forward end of the electrode 5 is moved along the groove wall as the electrode 5 is moved in the X-axis direction.

Figure 3:
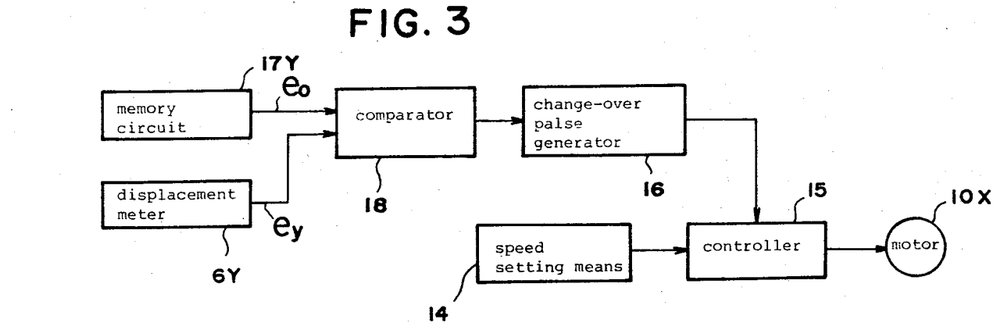
FIG. 3 is a block diagram showing an X-axis direction oscillation control circuit.

The movement of the electrode 5 in the X-axis direction is controlled by the drive control circuit shown in FIG. 3. More specifically, in FIG. 3 the X-axis motor 10X is adapted to be operated through a controller 15 at a constant speed preset by setting means 14 and the direction of rotation of the X-axis motor 10X is changed each time the controller 15 receives a signal from a change-over pulse generator 16. The Y-axis direction displace ey of the electrode 5 detected by the displacement meter 6 is compared with the end position set value $e_o$ preset and stored into a memory circuit 17 by a comparator 18 so that each time the displacement ey becomes equal to the set value $e_o$, a signal is generated from the comparator 18 and thus the change-over pulse generator 16 applies a change-over command signal to the controller 15.

Figure 4A:
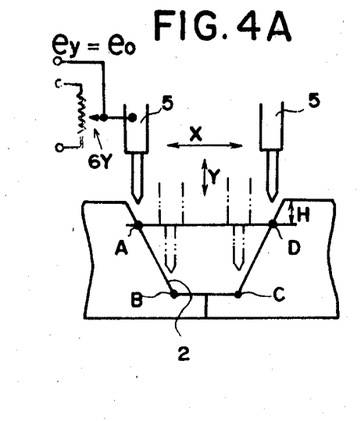
FIGS. 4A and 4B are respectively a diagram for explaining the oscillatory movement of a welding electrode and a diagram showing its detection waveform.

FIG. 4A shows the manner in which the electrode 5 is moved by the apparatus of FIG. 1 including the control systems shown in FIGS. 2 and 3. Referring to FIG. 4A, the electrode 5 is first placed at an end position A of the groove 2, for example. The resulting output or the Y-axis displacement $e_o$ from the displacement meter 6Y is stored in the memory circuit 17. When the electrode 5 is started to move in the X-axis direction, in accordance with the previously mentioned constant arc length control the electrode 5 is moved substantially along the walls of the groove 2 to move from the point A to points B, C and D in this order. When the electrode 5 reaches the point D, the output ey of the displacement meter 6Y again becomes equal to the value $e_o$ so that the output of the change-over pulse generator 16 is applied to the controller 15 via the comparator 18 and the X-axis motor 10X changes its direction of rotation. Thereafter, the electrode 5 is moved in the reverse direction via the points D, C, B and A in tnis order so that when the point A is again reached, the direction of movement of the electrode 5 is again changed in the similar manner. This operation takes place repeatedly. The oscillatory movement from one end (the point A or D) to the other end (the point D or A) is hereinafter referred to as a half cycle of the oscillation. According to this control method, even if the groove shape is changed in any way or even if the groove center deviates from the direction of movement of the welding traveller 3, the electrode 5 is always caused to change its direction of movement and oscillate within the groove width while maintaining its distance H from the base metal surface. The resulting output of the Y-axis displacement meter 6Y changes with time as shown by the waveform in FIG. 4B so that the inverted trapezoidal waveform generated for each half cycle of the oscillation corresponds to the then current groove cross-sectional shape and it will be seen that the area S of the hatched portion in the Figure corresponds to the cross-sectional area of the groove weld to be deposited.

Figure 5A:
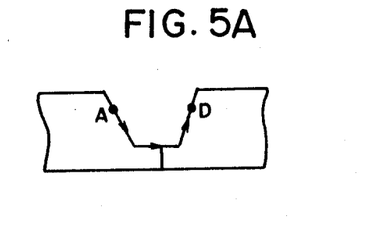
FIGS. 5A and 5B, FIGS. 6A and 6B and FIGS. 7A and 7B show respectively the relation between the groove shape and the Y-axis displacement waveform.
Figure 5B:
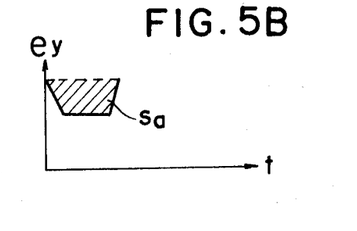
Figure 6A:
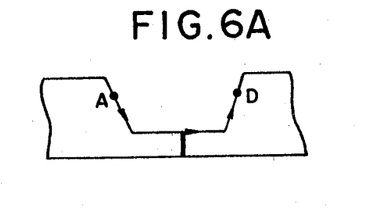
Figure 6B:
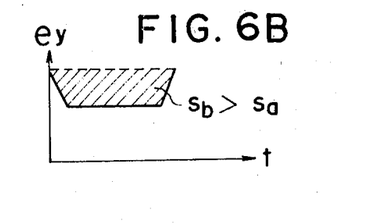
Figure 7A:
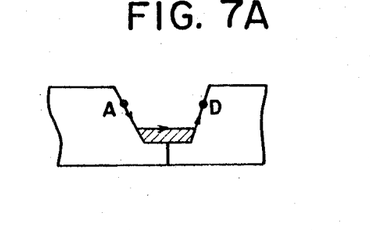
Figure 7B:
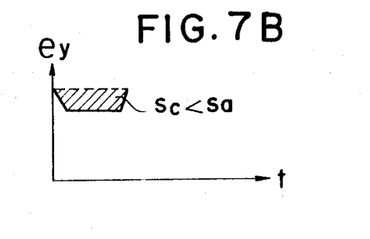

FIGS. 5A, 5B, 6A, 6B and 7A, 7B respectively show the relation between the groove shape in terms of the gap and the height of the underlaying bead as variables and the resulting Y-axis displacement waveform $e_y$. FIG. 5A shows the reference condition where the points A and D correspond to the extremities of the electrode oscillation shown in FIG. 4A, and the resulting waveform for the oscillation half cycle has the trapezoidal form of FIG. 5B whose base is the level of the output $e_o$ from the displacement meter 6Y for the points A and D. Thus the area Sa of the trapezoidal waveform can be detected as the time integral of the displacement meter output. FIGS. 6A and 6B show a case where the gap is increased and in this case the area Sb of the detected waveform is greater than that of FIG. 5B. Thus, by increasing the rate of metal deposition in accordance with the magnitude of the area Sb, it is possible to make the level of the weld bead uniform. FIGS. 7A and 7B show another case where the level of the underlying bead is varied and the desired rate of metal deposition can be determined in accordance with the area Sc of the resulting waveform.

Figure 4B:
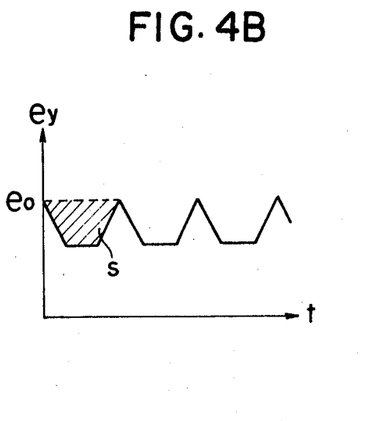

As shown in FIGS. 4A and 4B as well as FIGS. 5A and 5B to FIGS. 7A and 7B, in accordance with the welding method of the present invention, when the shape of the groove is varied, the cross-sectional area described by the electrode is obtained to thereby determined the rate of metal deposition corresponding to the desired uniform level of a weld bead.

The following examples described in greater detail the method of properly controlling the rate of metal deposition in accordance with the invention.

(1) Arc welding using a non-consumable electrode:

In the welding using a non-consumable electrode, with no feeding of a filler wire (through a separate feeding means), an arc is generated first and the electrode is oscillated thus producing the similar result as shown in FIGS. 4A and 4B, 5A and 5B, 6A and 6B or 7A and 7B. In other words, if S represents the cross-sectional area described by the electrode during the half cycle of the oscillation and V represents the welding speed, the then desired filler wire feed speed $V_f$ is given by $$V_f = C \cdot S \cdot V$$

Figure 8A:
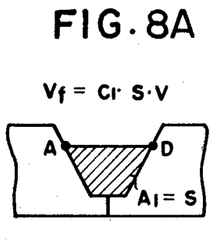
FIGS. 8A, 8B and 8C are diagrams showing exemplary cross-sectional shapes of metal deposition.
Figure 8B:
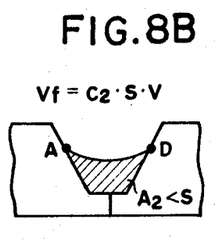
Figure 8C:
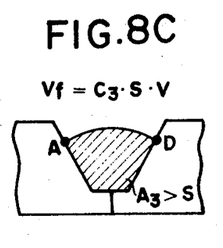

Here C is a constant and its value can be suitably selected to produce different bead shapes as shown in FIGS. 8A, 8B and 8C. FIG. 8A shows a case where a constant C, has a value such that the area S resulting from the Y-axis displacement waveform is equal to the actual cross-sectional area A, of metal deposition and this weld condition is not generally used frequently. Practically, weld conditions such as shown in FIGS. 8A and 8B are used frequently. More specifically, FIG. 8B shows a case where a constant $C_2$ is so selected that the resulting cross-sectional area $A_2$ of metal deposition is smaller than the waveform area S and the surface shape of the hatched bead cross-section is concaved. Thus this weld condition can be used as the intermediary layer of a multilayer weld to ensure an excellent penetration at the end portions. FIG. 8C shows another case where the resulting cross-sectional area $A_3$ of metal deposition is greater than the waveform area S and the surface shape of a bead cross-section is convexed. Thus this weld condition can be advantageously used as the required top or finish layer for the excess metal rather than for use inside the groove.

Figure 9A:
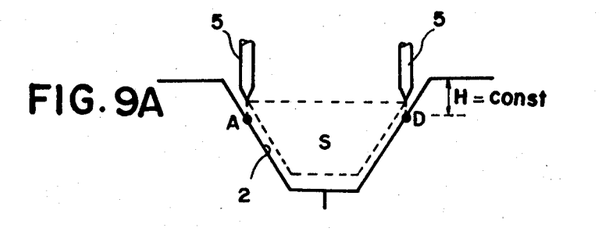
FIG. 9A is schematic diagram useful for explaining the concept for a non-consumable electrode are welding adapted to be effected without feeding a filler wire.

(2) Consumable electrode welding or non-consumable electrode arc welding effected while feeding a filler wire by separate means:

A non-consumable electrode is oscillated within the groove shown in FIG. 9A in the same manner as the above-mentioned case (1) and this results in the waveform area S enclosed by the dotted line in the Figure. If the groove has been filled with a weld metal of a cross-sectional area A by the consumable electrode welding or the filler feeding non-consumable electrode welding, then there results the oscillation trace of the waveform area $S_o$ shown in FIG. 9B.

Figure 9B:
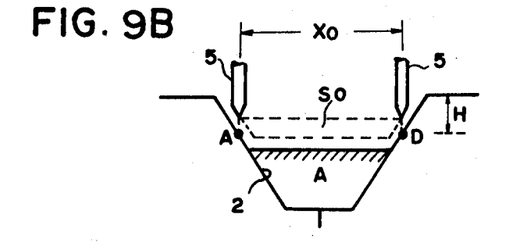
FIGS. 9B and 9C are schematic diagrams useful for explaining the concept of a consumable electrode arc welding or a non-consumable electrode arc welding adapted to be effected without feeding a filler wire.
Figure 9C:
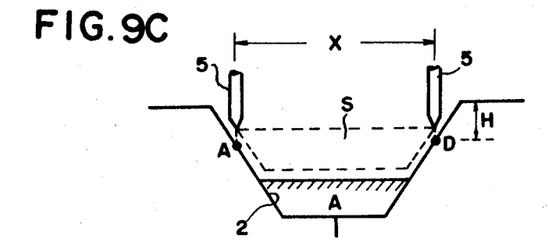
Figure 10:
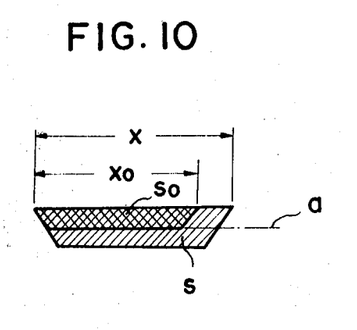
FIG. 10 is a diagram showing the overlapped oscillation traces of FIGS. 9B and 9C.

Assuming now that the gap is for example increased so that the groove changes from the condition of FIG. 9B to the condition of FIG. 9C, if the welding is effected under the same welding conditions, the level of the bead will be decreased and the half cycle oscillation trace of the electrode will take the form of the waveform area S. Thus, the superposition of the oscillation traces of FIGS. 9B and 9C results in what is shown in FIG. 10. Note that the oscillation strokes $x_o$ and x shown in the Figure are detected by the X-axis displacement meter 6X shown in FIG. 1. It will be seen from the Figure that by increasing the cross-sectional area of metal deposition by an amount corresponding to the area of the lower part of the trapezoidal cross-sectional area S which is below the dot-and-dash line a, it is possible to approximately obtain a weld bead of a uniform level. If $\Delta S$ represents an increase in the cross sectional area of metal deposition, then the increment $\Delta S$ is given approximately by $$\Delta S = S - \frac{x}{x_o} \cdot S_o$$

Next, the control method for determining the value of $\Delta S$ (the increment or decrement in the cross-sectional area of metal deposition) will be described. Basically, it is only necessary to vary the value of $V_f$ or V. In either of the cases, the relation $V_f = C \cdot S \cdot V$ is used.

(i) Control method of varying the welding speed V while maintaining the filler wire feed speed $V_f$ constant:

$$V = V_{fo} \cdot \frac{1}{C} \cdot \frac{1}{A + \Delta S}$$

Here, A represents the cross-sectional area of metal deposition before the variable speed control, and if $V_o$ and $V_{fo}$ show the speeds at that time, the following holds $$A = \frac{1}{C} \cdot \frac{V_{fo}}{V_o}$$

Where the welding speed V is varied, if the welding current I is constant, the heat input is varied. In such a case, generally the welding current I is also varied so that I/V is maintained constant. However, in the case of the consumable electrode welding using a constant voltage source, if the welding current I is varied, the filler wire feed speed $V_f$ must also be varied and thus this control cannot be used.

(ii) Control method of varying the filler wire feed speed $V_f$ while maintaining the welding speed V constant:

If $\Delta V_f$ represents and increment in the feed speed $V_f$, since $V_f = \Delta V_f + V_{fo}$, the increment $\Delta V_f$ is given by $$\Delta V_f = C \cdot \Delta S \cdot V_o$$

Where the filler wire feed speed $V_f$ is varied, there will be no problem with the consumable electrode welding using a constant voltage source since the welding current I varies substantially in proportion to the feed speed $V_f$. In the case of the consumable electrode welding or non-consumable electrode welding using a constant current source, however, it is preferable to also vary the welding current I in proportion to the feed speed $V_f$ for the purpose of preventing LF and so on.

Next, an embodiment of a control system employing the above-mentioned control method now will be described with reference to the accompanying drawings. An example of the circuit for automatically determining the filler wire feed speed $V_{fo}$ and the change $\Delta S$ will be described first and then an example of the control circuit which utilizes these data and circuit will be described.

Figure 11:
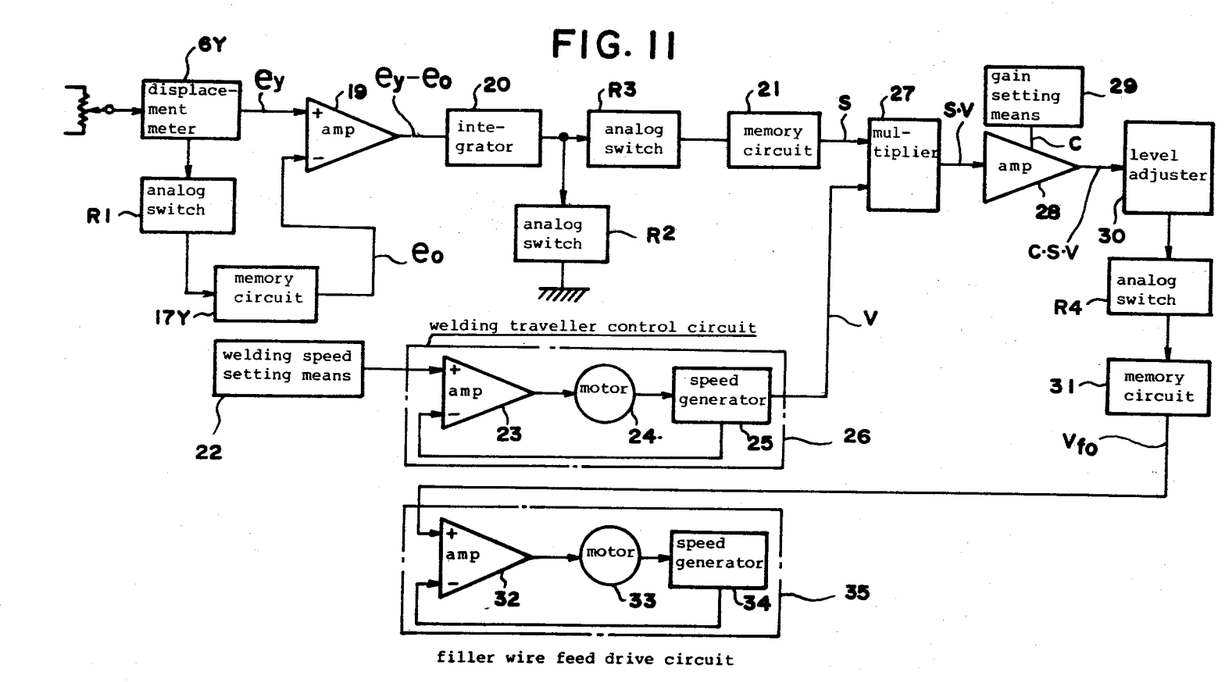
FIG. 11 is a block diagram showing a circuit for automatically setting an initial filler wire feed speed $V_{fo}$ in the non-consumable electrode welding.

FIG. 11 is a block diagram showing a circuit for automatically setting the initial filler wire feed speed $V_{fo}$ in the non-consumable electrode welding. In the Figure, the output of the displacement meter 6Y is initially held by an analog switch $R_1$ and then stored as a preset reference value $e_o$ in the memory circuit 17Y. After the control has been started, the output $e_o$ of the memory circuit 17Y and the output ey of the displacement meter 6Y are differentially amplified by a differential amplifier 19 whose output ey$-e_o$ is integrated by an integrator 20 over a period of time corresponding to the half cycle of the oscillation and a waveform area S is obtained. This waveform area S is held as a groove area by an analog switch $R_3$ and it is then stored in a memory circuit 21.

On the other hand, a reference value of the welding speed V is preset into welding speed setting means 22 and the welding speed V is controlled at a predetermined value by a welding traveller control circuit 26 comprising a differential amplifier 23, a traveller driving motor 24 and a speed generator 25. This welding speed V and the groove area S in the memory circuit 21 are applied to a multiplier 27 whose output S·V is in turn applied to an amplifier 28. The gain of the amplifier 28 is determined by gain setting means 29 and in this case the gain is represented by C. As a result, the output of the amplifier 28 becomes C·S·V so that it is held by an analog switch $R_4$ via a level adjuster 30 and then stored as an initial filler wire feed speed $V_{fo}$ $(=C \cdot S \cdot V)$ in a memory circuit 31. This feed speed $V_{fo}$ is applied as a reference value to a filler wire feed drive circuit 35 comprising a differential amplifier 32, a filler wire feed motor 33 and a speed generator 34 and the filler wire feed speed is controlled at the initial feed speed $V_{fo}$. In the Figure, designated at $R_2$ is an analog switch so that when the analog switches $R_2$ and $R_3$ are closed simultaneously, the groove area S stored in the memory circuit 21 is cleared.

Figure 12:
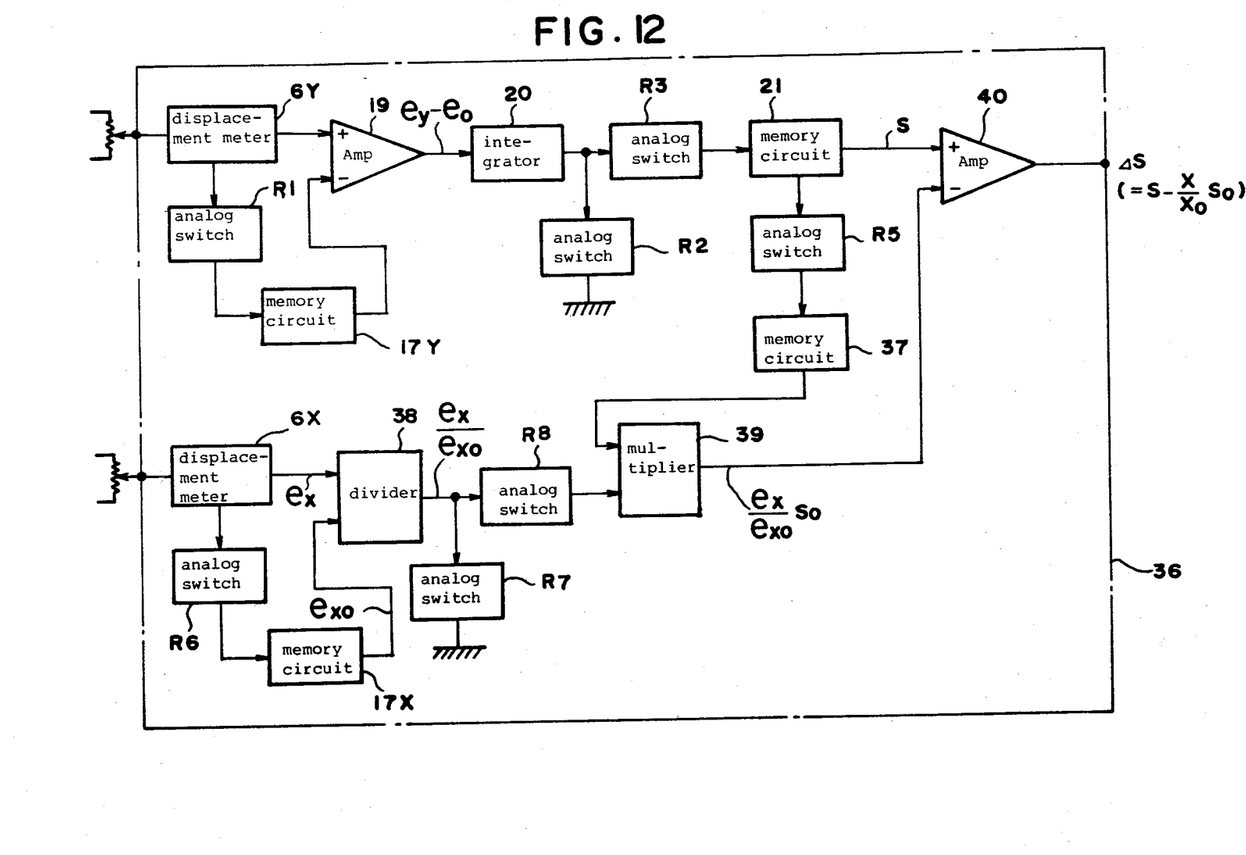
FIG. 12 is a block diagram showing a $\Delta S$ computing circuit.

FIG. 12 is a block diagram showing a $\Delta S$ computing circuit 36 for computing the previously mentioned change $\Delta S$. Initially, the output of the displacement meter 6Y is held by the analog switch $R_1$ and is stored as a reference set value $e_o$ in the memory circuit 17Y. After the control has been started, the output $e_o$ of the memory circuit 17Y and the output ey of the displacement meter 6Y are applied to the differential amplifier 19 whose output ey$-e_o$ is in turn integrated by the integrator 20 over a period of time corresponding to the half cycle of the oscillation to obtain a waveform area S. This waveform area S is held by the analog switch $R_3$ and then stored in the memory circut 21. The waveform area S is also held by an analog switch $R_5$ and is then stored as an initial groove area $S_o$ in a memory circuit 37.

On the other hand, the displacement meter 6X detects the groove width $x_o$ (see FIG. 9B) which was detected in the above-mentioned determination of the groove area $S_o$ so that the resulting output $ex_o$ of the displacement meter 6X is held by an analog switch $R_6$ and is then stored in a memory circuit 17X.

After the next half cycle of the oscillation is over, the output ey of the Y-axis displacement meter 6Y is again applied, along with the output $e_o$ of the memory circuit 17Y, to the differential amplifier 19 whose output ey$-e_o$ is then integrated by the integrator 20 over a period of time corresponding to the half cycle of the oscillation to obtain a waveform area S. This waveform area S is held by the analog switch $R_5$ and is then stored as a groove area in the memory circuit 21.

On the other hand, the X-axis displacement meter 6X detects the groove width x (see FIG. 9c) which was used in the above-mentioned determination of the groove area S and the resulting output ex is applied, along with the output $ex_o$ of the memory circuit 17X, to a divider 38. The resulting output $ex/ex_o$ of the divider 38 is held by an analog switch $R_8$ and is then applied, along with the output $S_o$ of the memory circuit 37, to a multiplier 38. The resulting output $ex/ex_o \cdot S_o$ of the multiplier 39 is applied, along with the output S of the memory circuit 21, to a differential amplifier 40 which in turn generates $\Delta S = S - x/x_o \cdot S_o$. In this way, the computation of $\Delta S$ is effected for each half cycle of the oscillation through opening and closing of the analog switches $R_2$, $R_3$, $R_5$, $R_7$ and $R_8$ and the value of $\Delta S$ is updated.

Figure 13:
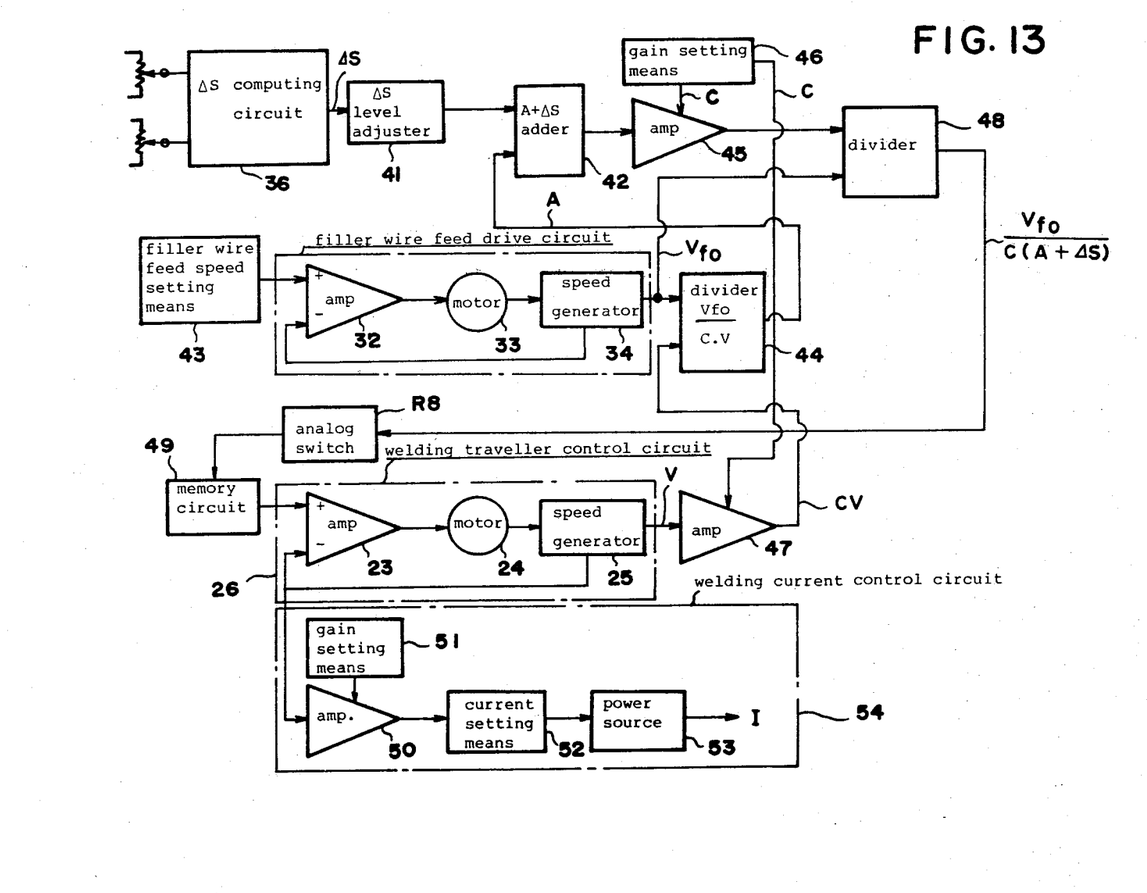
FIG. 13 is a block diagram showing a welding speed control circuit.

FIG. 13 is a block diagram showing a welding speed control circuit for controlling the welding speed V while maintaining constant the filler wire feed speed $V_f$. The output $\Delta S$ of the $\Delta S$ computing circuit 36 which was described with reference to FIG. 12, is applied to an adder 42 via a level adjuster 41. The output $V_{fo}$ of filler wire feed speed setting means 43 is applied to the filler wire feed drive circuit 35 so that the feed speed of the filler wire is controlled at the constant value $V_{fo}$. The preset speed value of the speed setting means 43 is obtained in the same manner as described in detail with reference to FIG. 11. The filler wire feed speed $V_{fo}$ is detected by the speed generator 34 whose output $V_{fo}$ is applied, along with the output C·V of an amplifier which will be described later, to a divider 44 whose output $A(=V_{fo}/C \cdot V)$ is in turn applied to the adder 42. The resulting sum output A$+\Delta S$ of the adder 42 is applied to an amplifier 45. The gain of the amplifier 45 is set by gain setting means 46 and this gain is represented by C. This gain setting means 46 also sets similarly the gain of an amplifier 47 which will be described later. The amplifier 47 amplifies the welding speed signal by the gain C so that the resulting output C·V is applied to the divider 44.

As a result, the output of the amplifier 45 becomes $C(A+\Delta S)$ and it is applied, along with the output of the speed generator 34 or the filler wire feed speed $V_{fo}$, to a divider 48 and a welding speed $V = V_{fo}/C(A + \Delta S)$ is obtained. The output V of the divider 48 is held by the analog switch $R_8$ and is then stored as a reference welding speed V in a memory circuit 49. Since the change $\Delta S$ is computed anew every half cycle of the oscillation, the reference speed V is updated every half cycle of the oscillation by way of the analog switch $R_8$.

The welding speed signal V which was newly stored in the memory circuit 49 is applied to the welding traveller control circuit 26 and the welding speed is controlled at the desired value V.

On the other hand, the welding speed signal V from the speed generator 25 is also applied to a welding current control circuit 54 comprising an amplifier 50, gain setting means 51, current setting means 52 and a power source 53 and thus the welding current I is controlled to make it proportional to the welding speed V. In this case, the proportionality constant is the value of the gain of the gain setting means 51 and is represent by B in this embodiment.

Figure 14:
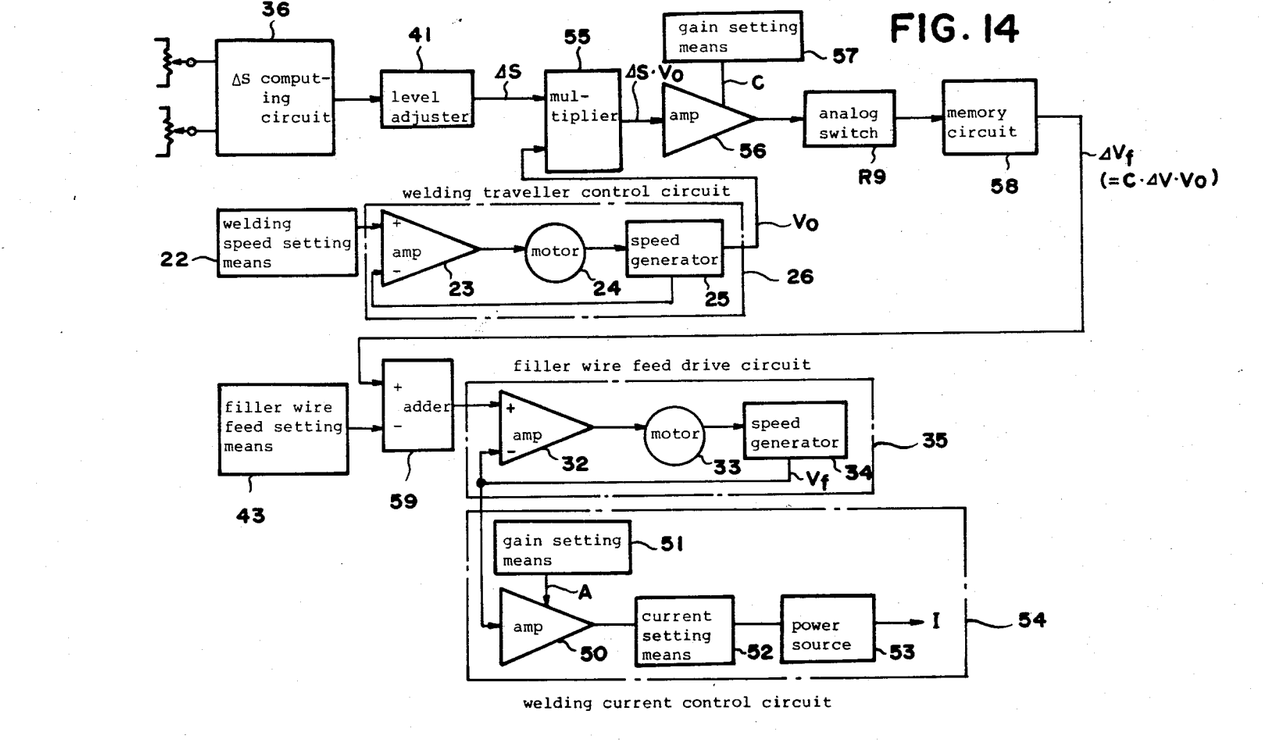
FIG. 14 is a block diagram showing a filler wire control circuit.

FIG. 14 is a block diagram showing a filler wire control circuit which controls the filler wire feed speed $V_f$ while maintaining the welding speed V constant. As in the case of FIG. 13, a change $\Delta S$ is computed by the $\Delta S$ computing circuit 36 and the change $\Delta S$ is applied to a multiplier 55 via the level adjuster 41.

A predetermined speed $V_o$ is preset into the welding speed setting means 22 so that in accordance with the preset value the welding traveller speed control circuit 26 is controlled to provide the predetermined speed $V_o$. The then current welding speed signal is generated from the speed generator 25 and then applied to the multiplier 55 which in turn generates a product $\Delta S \cdot V_o$. The output $\Delta S \cdot V_o$ of the multiplier 55 is applied to an amplifier 56. The gain of the amplifier 56 is set by gain setting means 57 and the gain is represented by C. As a result, the output of the amplifier 56 becomes $\Delta V_f = C \cdot \Delta S \cdot V$. The output $\Delta V_f$ is held by an analog switch $R_9$ and is then stored in a memory circuit 58. Since the computation of $\Delta S$ is effected every half cycle of the oscillation, the stored contents of the memory circuit 58 is also updated by way of the analog switch $R_9$. The output $\Delta V_f$ of the memory circuit 58 is applied, along with the output $V_{fo}$ of the filler wire feed speed setting means 43, to an adder 59 which in turn generates an output $V_{fo} + \Delta V_f$. The output $V_o + \Delta V_f$ of the adder 59 is applied as a reference value to the filler wire feed drive circuit 35 so that the filler wire feed speed is controlled at the value $V_{fo} + \Delta V_f$. The present speed value $V_{fo}$ is computed in the same manner as described in detail in connection with FIG. 11.

On the other hand, the welding current control circuit 54 receives the filler wire feed speed $V_f$ signal from the speed generator 34 so that the welding current I is controlled so as to become proportional to the filler wire feed speed $V_f$. In this case, the proportionality constant is the value of the gain set by the gain setting means 51 and in this embodiment the proportionality constant is represented by A.

While, in the above-described embodiments, each of the memory circuits stores an analog quantity through the analog switch, the invention is of course not intended to be limited thereto.

From the foregoing it will be seen that the present invention has among its advantages the fact that since the arc itself performs the tracer control for welding joints of different groove shapes without using any special tracing sensor, there is no possibility of any delay in the tracer control system and the electrode assembly can be reduced in size. Moreover, a stable weld bead can always be deposited irrespective of the welding position and the tracing of the groove width is simultaneously effected with the occurrence of a change in the groove shape thus allowing the tracing of any deviation of the groove line as well as the stable arc welding through unattended automatic operation.

Another advantage is that in response to a change in the groove shape the cross-sectional area described by the electrode is detected so that the welding metal is supplied in an amount corresponding to the cross-sectional area and thus the uniform bead level is ensured.

What is claimed is:

1. In an arc welding method of the type in which while oscillating a welding electrode in a width direction within a groove of a pair of metals to be welded, the vertical movement of said electrode is controlled so as to always maintain an arc length constant, the improvement comprising the steps of: arc welding said groove of a predetermined shape by using a predetermined welding speed and wire feed speed; upon completion of a half cycle of oscillation of said electrode, integrating a vertical displacement of said electrode over a period of time to obtain a cross-sectional area $S_o$ described by said electrode and also obtaining an oscillation stroke $x_o$ of said electrode; storing said cross-sectional area S and said oscillation stroke in memory means; similarly obtaining a cross-sectional area S and an oscillation stroke x for the next half cycle of oscillation of said electrode; and varying a cross-sectional area of metal deposition by an amount $\Delta S$ given by $$\Delta S = S - \frac{x}{x_o} S_o,$$

whereby providing a weld bead having a uniform level.

2. An arc welding method according to claim 1, wherein the wire feed speed $V_f$ is maintained constant and the welding speed V is controlled in accordance with a relation $$V = V_f \cdot \frac{1}{C} \cdot \frac{1}{A + \Delta S},$$

where A is a cross-sectional area of metal deposition obtained before controlling said welding speed V to vary, and C is a constant.

3. An arc welding method according to claim 2, wherein said welding speed V is controlled to vary, and wherein a welding current I is controlled to make the same proportional to said welding speed V.

4. An arc welding method according to claim 1, wherein the welding speed V is maintained constant, and the wire feed speed $V_f$ is increased in accordance with a relation $\Delta V_f = V \cdot C \cdot \Delta S$, where C is a constant and $\Delta V_f$ is an increment of said wire feed speed $V_f$.

5. An arc welding method according to claim 4, wherein said wire feed speed $V_f$ is controlled to vary, and wherein a welding current I is controlled to make the same proportional to said wire feed speed $V_f$.

* * * * *